United States Patent [19]
Phillips

[11] Patent Number: 6,102,075
[45] Date of Patent: Aug. 15, 2000

[54] FLOW CONTROL DEVICE

[75] Inventor: Raymond E. Phillips, Rolla, Mo.

[73] Assignee: Parker-Hannifin Corporation, Cleveland, Ohio

[21] Appl. No.: 08/344,746

[22] Filed: Nov. 23, 1994

[51] Int. Cl.[7] .................................................. F16L 55/04
[52] U.S. Cl. .......................... 138/31; 138/45; 137/513.5; 251/324
[58] Field of Search ............................... 138/26, 30, 31, 138/45; 251/63, 324; 137/504, 513.5

[56] References Cited

U.S. PATENT DOCUMENTS

| Re. 24,223 | 9/1956 | Ford et al. | 138/31 |
|---|---|---|---|
| 2,715,419 | 8/1955 | Ford et al. | 138/31 |
| 2,974,683 | 3/1961 | Kahelin | 138/31 |
| 3,111,138 | 11/1963 | Humphreys et al. | 137/513.5 X |
| 3,613,734 | 10/1971 | Elmer | 138/31 |
| 3,901,272 | 8/1975 | Banners et al. | 138/45 X |
| 3,992,898 | 11/1976 | Duell et al. | 138/45 X |
| 4,166,655 | 9/1979 | Spero | 138/31 X |
| 4,177,837 | 12/1979 | Frank et al. | 138/31 |
| 4,200,119 | 4/1980 | Cunningham | 138/45 X |
| 4,749,071 | 6/1988 | Taylor | 138/31 X |
| 4,825,916 | 5/1989 | Fink, Jr. | 137/504 X |
| 5,219,000 | 6/1993 | Chalasani et al. | 138/31 |
| 5,383,489 | 1/1995 | Golestan et al. | 137/504 |
| 5,385,172 | 1/1995 | Perrott et al. | 138/31 |

*Primary Examiner*—Patrick Brinson
*Attorney, Agent, or Firm*—Christopher H. Hunter

[57] ABSTRACT

A fluid flow control device for use in heat pump systems is provided. The device includes an elongated body shaped to define a plurality of lines of contact along the elongated body which reduces operational noise and which improves fluid flow characteristics. In a preferred embodiment, the device includes four or six lines of contact. The device may also include a highly angled nose region to improve seating and stability.

12 Claims, 4 Drawing Sheets

FLOW CONTROL DEVICE

TECHNICAL FIELD

The present invention relates generally to flow control devices and more particularly to flow control devices for use in heat pump systems for air conditioning units and the like.

BACKGROUND OF THE INVENTION

It is known in the prior art to provide a flow control device such as a piston in a conduit such that when coolant flows in a forward direction, the device engages and meters the flow of the coolant. When the piston is disengaged, flow of the coolant is reversed and flow is in an unrestricted manner.

When flow control devices are positioned within a conduit and are further positioned to move in a predetermined manner with respect thereto, flow conditions often result in high fluid velocities in the areas close to or adjacent to the device. Consequently, operational noise associated with the flow and turbulence of the fluid as it moves in relation to the device is thereby produced. Operational noises traditionally tend to be rattles, vibrations and the like. Additionally, the fundamentals of fluid mechanics teach that the forces developed by moving fluids result in noise and turbulent flow near the device. This is in part attributable to the unequal distribution of noise levels passing over the piston or flow control device.

Attempts to reduce noise level associated with flow control devices have been of limited success. For example, U.S. Pat. No. 4,896,696 to Bradley, et al discloses a flow control restrictor. However, there is still a need in the art for a flow control device which further reduces operational noise and eliminates other disadvantages associated with the prior art such as difficulties with respect to sizing, fit, sticking, cocking and failure to seat correctly.

It would therefore be desirable to provide a flow control device which controls the rate of flow in one direction, provides unrestricted flow in the reverse direction and which eliminates the shortcomings associated with the prior art.

BRIEF SUMMARY OF THE INVENTION

The present invention overcomes the foregoing and other problems with an improved flow control piston having a specific configuration on the outer surface thereof to distribute and direct the flow of coolant or fluid. The flow control device in accordance with the present invention has the advantage of a shaped elongated body which equally distributes the flow across the surface of the piston. In an alternative embodiment of the invention, the nose of the piston has a greater angle or is sharper than devices of the prior art to reduce drag and improve stability of the piston. One of the advantages of the device in accordance with the present invention is that flow control, including the equal distribution of flow, is improved in both the regulated and the unregulated flow positions. The equal distribution of flow greatly enhances the stability of the piston. Consequently, noise levels influenced by fluid passing over the device is reduced. Although not required, another embodiment of the present invention may include a channel in the device such that a gasket may be positioned therein.

In preferred embodiments of the invention, an elongated body of the device has a square configuration such that four flows about the body are provided. In a more preferred embodiment of the invention, the device has a hexagon configuration and thus includes six flows about the body. Additional embodiments may also include elongated bodies having a rectangular or pentagonal shape. Additionally, these embodiments may also include a nose portion which is not as blunt as the noses of devices known in the art. This provides the further advantage of reducing cocking, thereby allowing for increased guidance for seating and enhanced stability. In this manner, noise levels due to rattle and vibrations are minimized by equally dividing the flow and turbulence waves within the system.

The foregoing has outlined some of the more pertinent aspects of the present invention. These aspects should be construed to be merely illustrative of some of the more prominent features and applications of the invention. Many other beneficial results can be attained by applying the disclosed invention in a different manner or modifying the invention as will be described. Accordingly, other aspects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
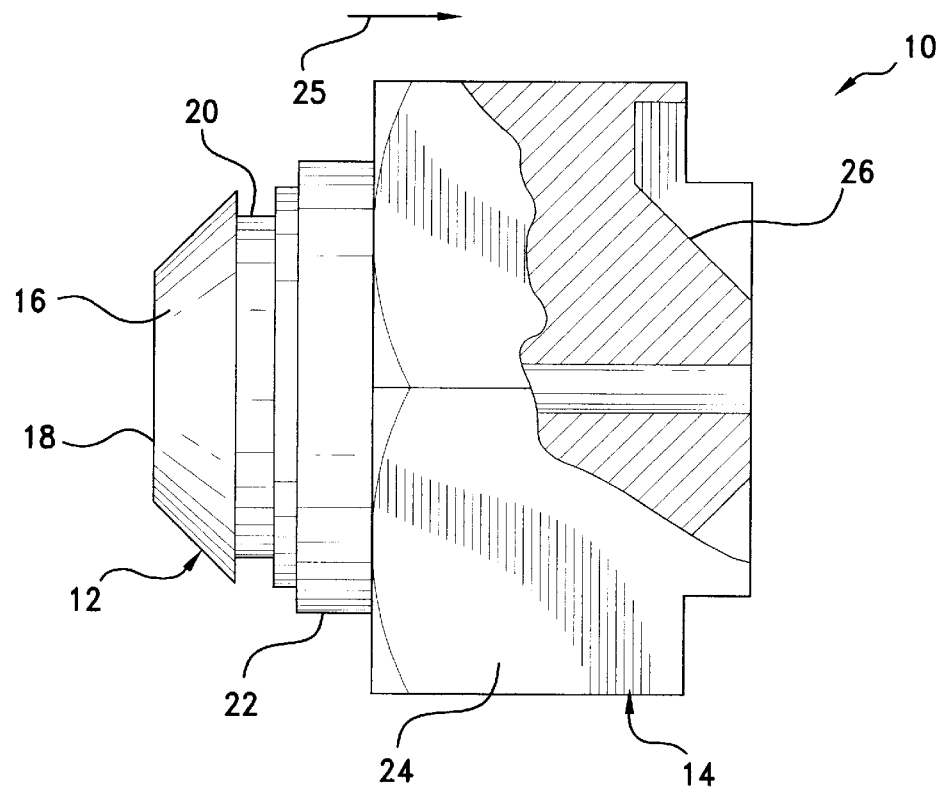
FIG. 1 is a partial cross-sectional side view of a first embodiment of the present invention.

Referring now to the drawings and more particularly to FIG. 1, there is illustrated a partial cross-sectional, side view of a first embodiment of the present invention. The flow control piston 10 includes a nose region 12 on an elongated body 14. The nose region 12 consists of a nose cone 16 shaped like a truncated cone. The truncated portion of the nose cone 16 forms the leading edge 18 of the flow control piston 10. The nose cone 16 also includes a channel 20 for receiving a gasket providing sealing characteristic for the piston 10 when the piston is in the regulated flow position which will be more fully discussed in a moment. The piston 10 will seat on a gasket or the nose cone 16 when the piston 10 is in the regulated flow position.

The elongated body 14 comprises a hexagonally-shaped surface 24. When fluid flow passes over the piston 10 the hexagonally-shaped surface 24 provides six lines of contact, one along each face of the hexagonal surface 24 such that the volume of fluid flow past the piston 10 is substantially split into six equal flow distributions. This equal distribution of fluid flow about the piston 10 improves the seating and stability of the piston during nonregulated fluid flow. Additionally, the noise levels associated with fluid passing over the piston 10 are greatly reduced due to the equal divisions of fluid flow over the surface of the piston. While FIG. 1 is described with respect to the elongated body 14 having a hexagonal surface 24, the present invention functions equally well when a square surface is used in place of the hexagonal surface, rectangular or pentagonal on the elongated body 14.

The rear portion of the elongated body 14 also could include a conical surface 26 acting as a fin to control the effects of turbulent flow over the hexagonal surface 24. A bore 30 passes through the interior of the piston 10 along the longitudinal axis of the piston to enable flow in both the regulated and unregulated flow directions.

Figure 2:
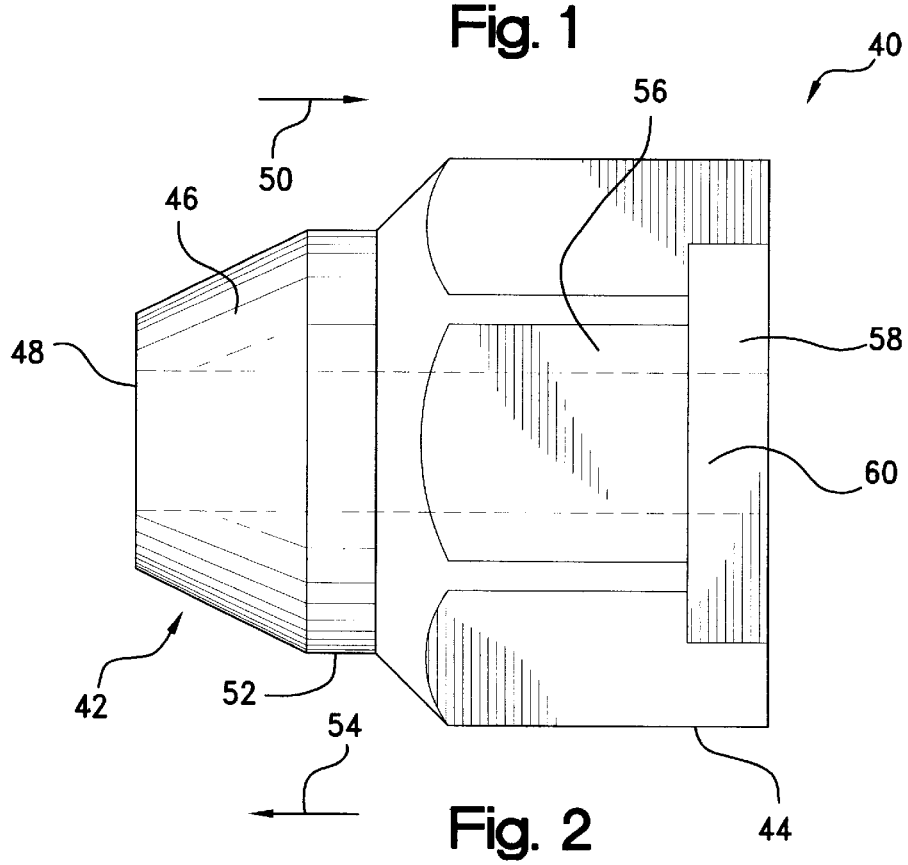
FIG. 2 is a side view of a second embodiment of the present invention.

Referring now to FIG. 2, there is illustrated an alternative embodiment of the present invention for a flow control piston 40. In this embodiment, the piston 40 again comprises a nose region 42 connected by a trailing edge to an elongated body 44. The nose region 42 includes a nose cone 46 shaped as a truncated cone wherein the truncated portion of the cone form the leading edge 48 of the nose cone 46. The surface of the nose cone 46 is steeply angled to substantially reduce the drag forces of fluid flow in the direction indicated generally by arrow 50. The steeply angled surface of the nose cone 46 greatly reduces the energy and forces acting on the piston 40 and substantially reduces rattling and vibrations by the piston. The piston 40 will seat on the nose cone 46 when the piston is in the regulated flow condition.

Elongated body 44 comprises a hexagonal surface 56. As described previously with respect to FIG. 1, the hexagonal surface 56 provides six lines of contact along each of the hexagonal surfaces which substantially split the volume of fluid flow into equal distributions along each face of the hexagonal surface 56. This reduces the rattle and vibrations of the piston 40 caused by the fluid flow. A rear fin 58 on the trailing edge of the elongated body 44 could be utilized to control the turbulent flow of fluids past the hexagonal surface 56. A bore 60 along the longitudinal axis of piston 40 enables the passage of fluid flow through the interior of the piston.

While the piston 40 of FIG. 2 has been described generally wherein the elongated body 44 has a hexagonal surface 56, it should also be noted that the elongated body 44 may also have a square, rectangular or pentagonal surface. In the case of a square or rectangular surface, four lines of contact are created (one along each surface) to equally divide the fluid flow past the piston 40 to reduce rattle and vibrations within the piston 40 created by the fluid flow. In the case of a pentagonal surface, five lines of contact are created.

Figure 3:
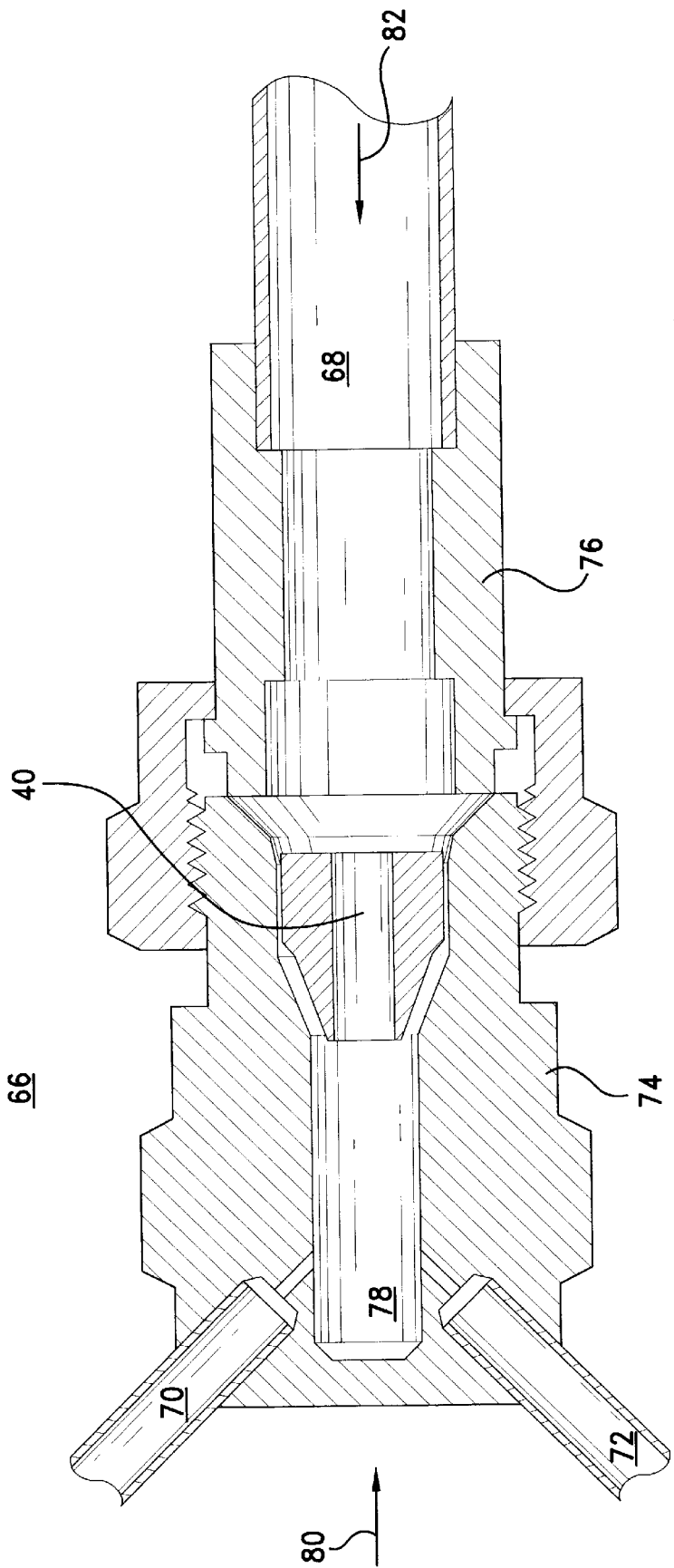
FIG. 3 is a cross-sectional view illustrating the flow control device of the present invention positioned in a conduit of a heat pump system.
Figure 4A:
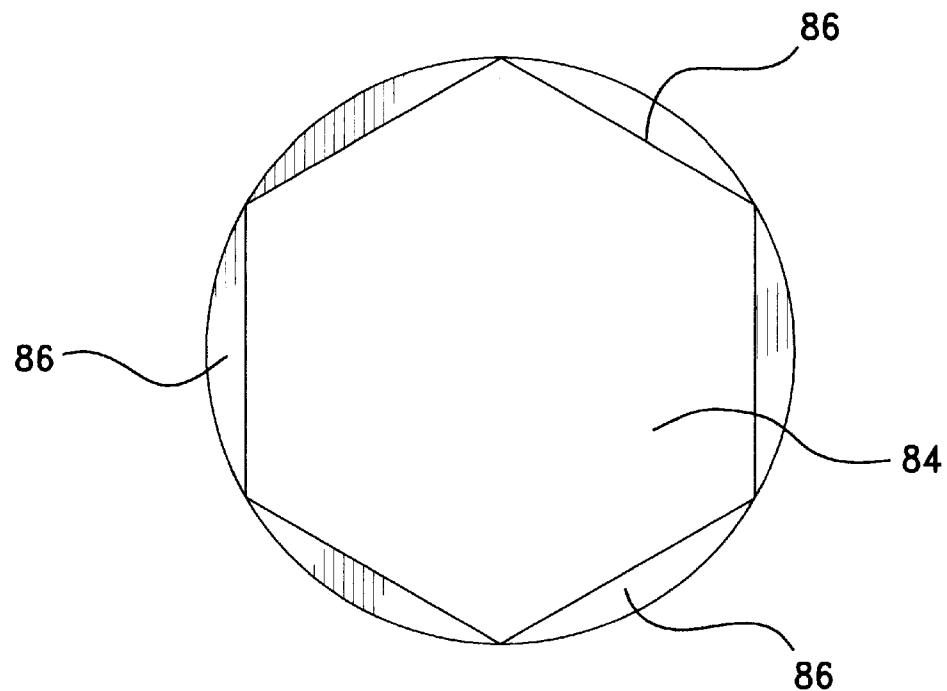
FIGS. 4A through 4D are cross-sectional end views of conduits containing a flow control device of the present invention illustrating the flow channels formed therein.
Figure 4B:
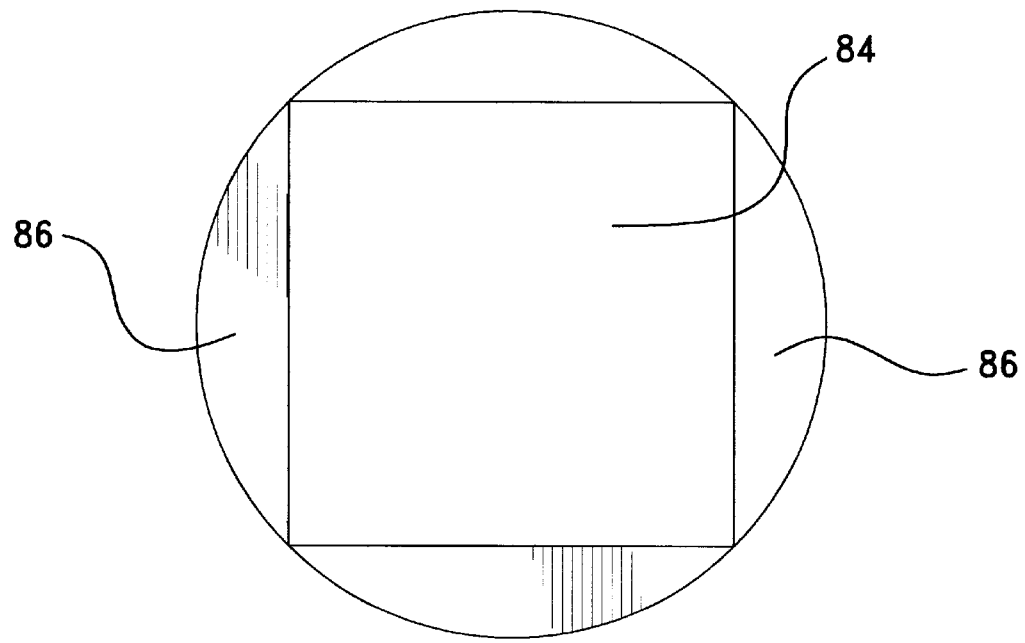
Figure 4C:
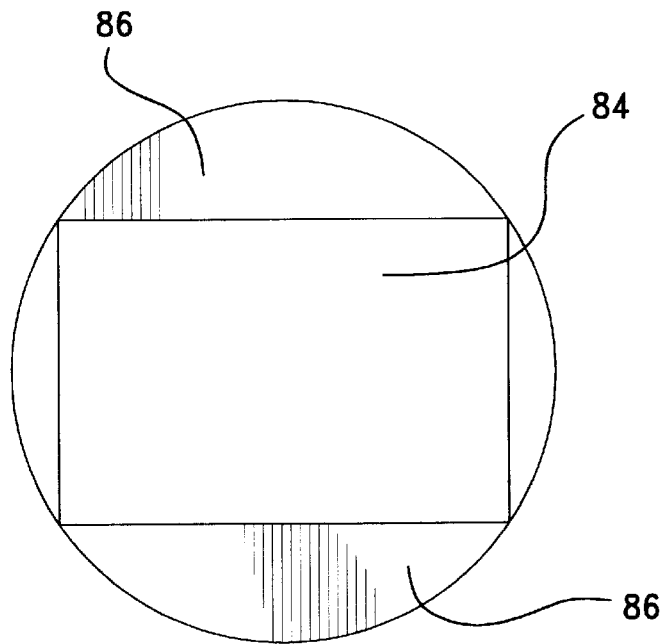
Figure 4D:
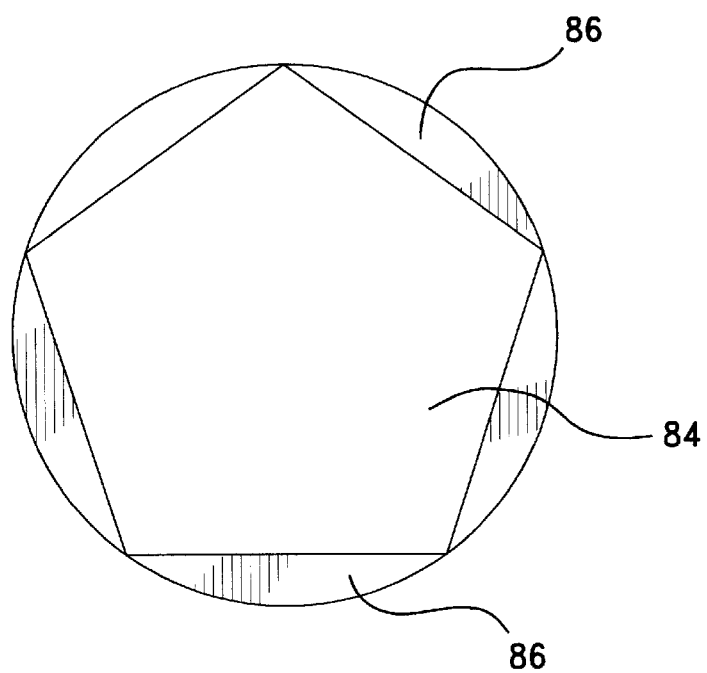

Referring now the FIG. 3, there is illustrated the previously described second embodiment of the present invention installed within a conduit of a heat pump system 66. The heat pump system 66 includes conduits 68, 70, and 72 interconnected with one another by fittings 74 and 76 which are threadedly engaged with each other. Fittings 74 and 76 include a chamber 78 enabling a fluid, typically a coolant, to flow between the conduits. Fluid flows in the direction of arrow 82 when the flow is regulated and in the direction of arrow 80 when the flow is unregulated.

The piston 40 of FIG. 2 is slidably mounted in the axial direction within the chamber 78. When fluid flows in the direction of arrow 80, the piston 40 moves in the direction of arrow 80 until the piston engages fitting 76 providing fluid flow at an unregulated rate. The angled nose cone and multiple lines of contact provided by the hexagonal or square surface of the elongated body 44 greatly reduce the rattling or vibration of the piston 40 when the piston is positioned in this location. When the direction of fluid flow is reversed to the direction of arrow 82, piston 40 disengages fitting 76, moves axially in the direction of arrow 82 and engages fitting 74. Flow in this direction is regulated. While the description of FIG. 3 has been made with respect to the embodiment disclosed in FIG. 2, any of the embodiments or modifications previously disclosed would be utilized within a conduit in a similar manner.

Referring now to FIGS. 4A through 4D, there are illustrated end views of conduits containing hexagonal, rectangular, square and pentagonal pistons 84 in accordance with the present invention. As can be seen from the figures, the shaped pistons 84 each create a plurality of substantially equally sized passages 86 for directing the fluid flow around the piston. These passages 86 will split the volume of fluid flow into substantially equal distributions passing around each surface (or line of contact) of the piston. The equally distributed fluid flows and the aerodynamically-shaped nose cone of the piston, greatly reduce rattling and vibrations within the piston caused by fluid flow over the piston.

It should be appreciated by those skilled in the art that the specific embodiments disclosed above may be readily utilized as a basis for modifying or designing other structures for carrying out the purposes of the present invention. It should also be realized by those skilled in the art that such equivalent constructions do not depart from the spirit and scope of the invention as set forth in the appended claims.

What is claimed is:

1. A flow control piston for use within a flow regulator controlling regulated and unregulated flow, comprising:
    a conical nose region having a leading and a trailing edge, the leading edge pointing in the direction of the regulated flow; and
    an elongated body connected to the trailing edge of the conical nose region having an outer surface with a square shape having planar exterior faces directing fluid flow around the flow control piston during unregulated flow, the square shape of the outer surface providing stability to the flow control piston by spreading and directing fluid flow into four equally distributed flows passing the flow control piston during unregulated flow.

2. The flow control piston of claim 1 wherein the conical nose region is tapered toward the leading edge to reduce drag on the flow control piston and improve stability of the piston during unregulated flow.

3. The flow control piston of claim 1 further including a channel positioned on the outer surface of the body for receiving a gasket.

4. The flow control piston of claim 1 further including a fin located at a trailing edge of the elongated body to control turbulent flow passing the elongated body during unregulated flow.

5. The flow control piston of claim 1 further including a channel passing completely through the flow control piston along a longitudinal axis of the flow control piston for enabling regulated fluid flow.

6. A flow control piston for use within a flow regulator controlling fluid flows in a regulated direction and an unregulated direction, comprising:
    a nose region having a surface angled to reduce drag on the flow control piston and enhance the stability of the piston during fluid flow in the unregulated direction; and
    an elongated body connected to a trailing edge of the nose region and having an outer surface with a hexagonal shape having planar exterior faces directing fluid flow passing the flow control piston during fluid flow in the unregulated direction, the hexagonal shape of the outer surface providing stability to the flow control device by spreading and directing fluid flow into equally distributed flows passing the flow control piston during unregulated flow.

7. The flow control piston of claim 6 further including a channel positioned on the outer surface of the body for receiving a gasket.

8. The flow control piston of claim 6 further including means located at a trailing edge of the elongated body for controlling turbulent flow past the elongated body during unregulated flow.

9. The flow control piston of claim 6 further including a channel passing completely through the flow control piston along a longitudinal axis of the flow control piston for enabling regulated fluid flow.

10. A flow control piston for use within a flow regulator controlling regulated and unregulated flow, comprising:

a conical nose region having a leading and a trailing edge, the leading edge pointing in the direction of the regulated flow; and an elongated body connected to the trailing edge of the conical nose region having an outer surface with a pentagonal shape having planar exterior faces for directing fluid flow around the flow control piston during unregulated flow, the pentagonal shape of the outer surface providing stability to the flow control piston by spreading and directing fluid flow into equally distributed flows passing the flow control piston during unregulated flow.

11. The flow regulator of claim 10 further including means located at a trailing edge of the elongated body for controlling turbulent flow passing the elongated body.

12. The flow regulator of claim 10 further including a channel passing completely through the piston along a longitudinal axis of the piston for enabling flow in the regulated direction.

\* \* \* \* \*